G. F. ECKART.
TOBACCO STEMMING MACHINE.
APPLICATION FILED JAN. 3, 1912.
1,044,506.
Patented Nov. 19, 1912.
11 SHEETS—SHEET 1.
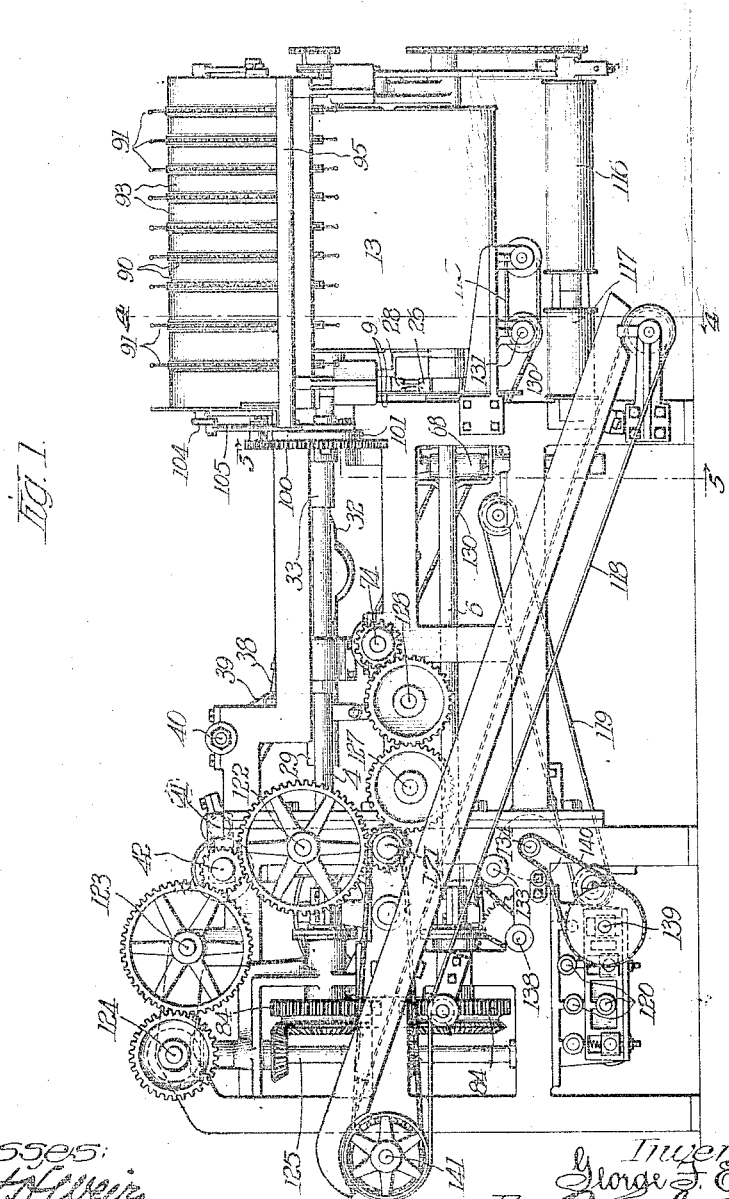

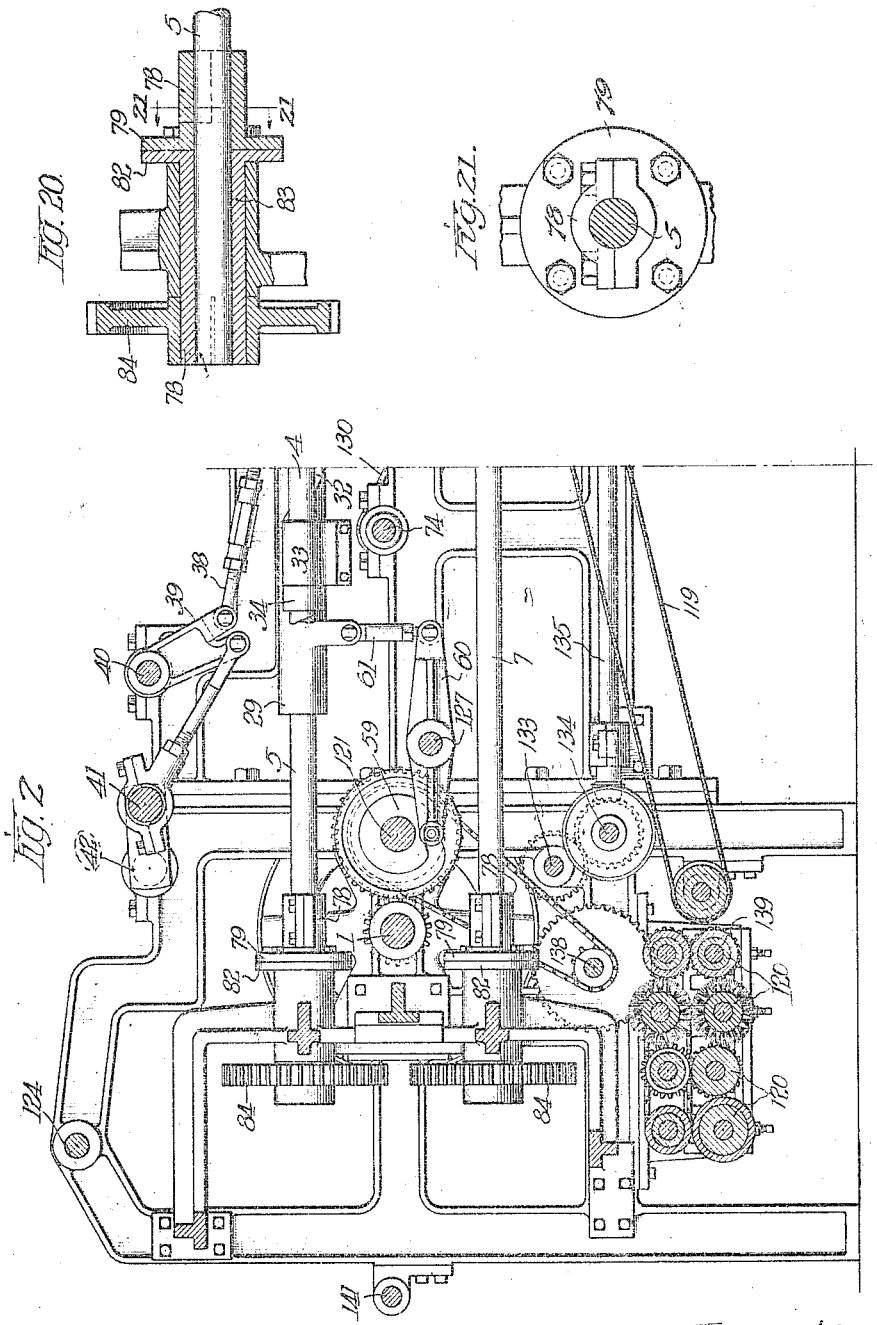

G. F. ECKART.
TOBACCO STEMMING MACHINE.
APPLICATION FILED JAN. 3, 1912.
1,044,506.
Patented Nov. 19, 1912.
11 SHEETS—SHEET 3.
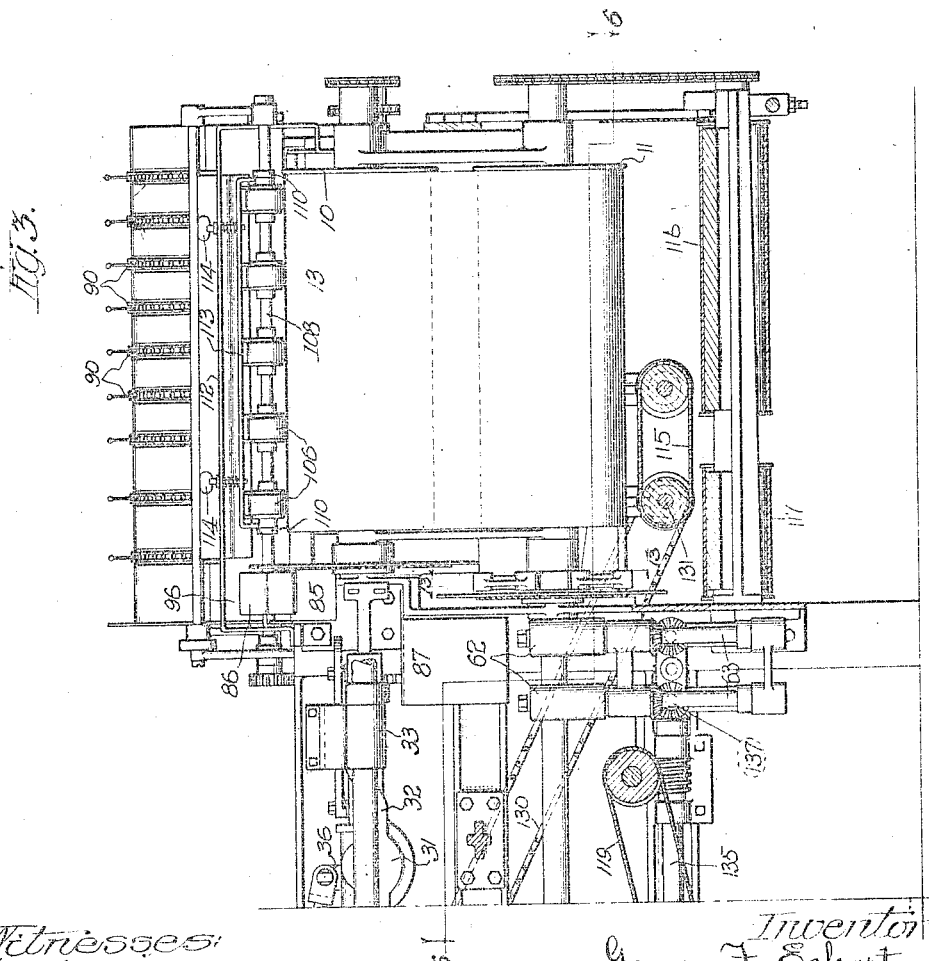

G. F. ECKART.
TOBACCO STEMMING MACHINE.
APPLICATION FILED JAN. 3, 1912.
1,044,506.
Patented Nov. 19, 1912.
11 SHEETS—SHEET 4.
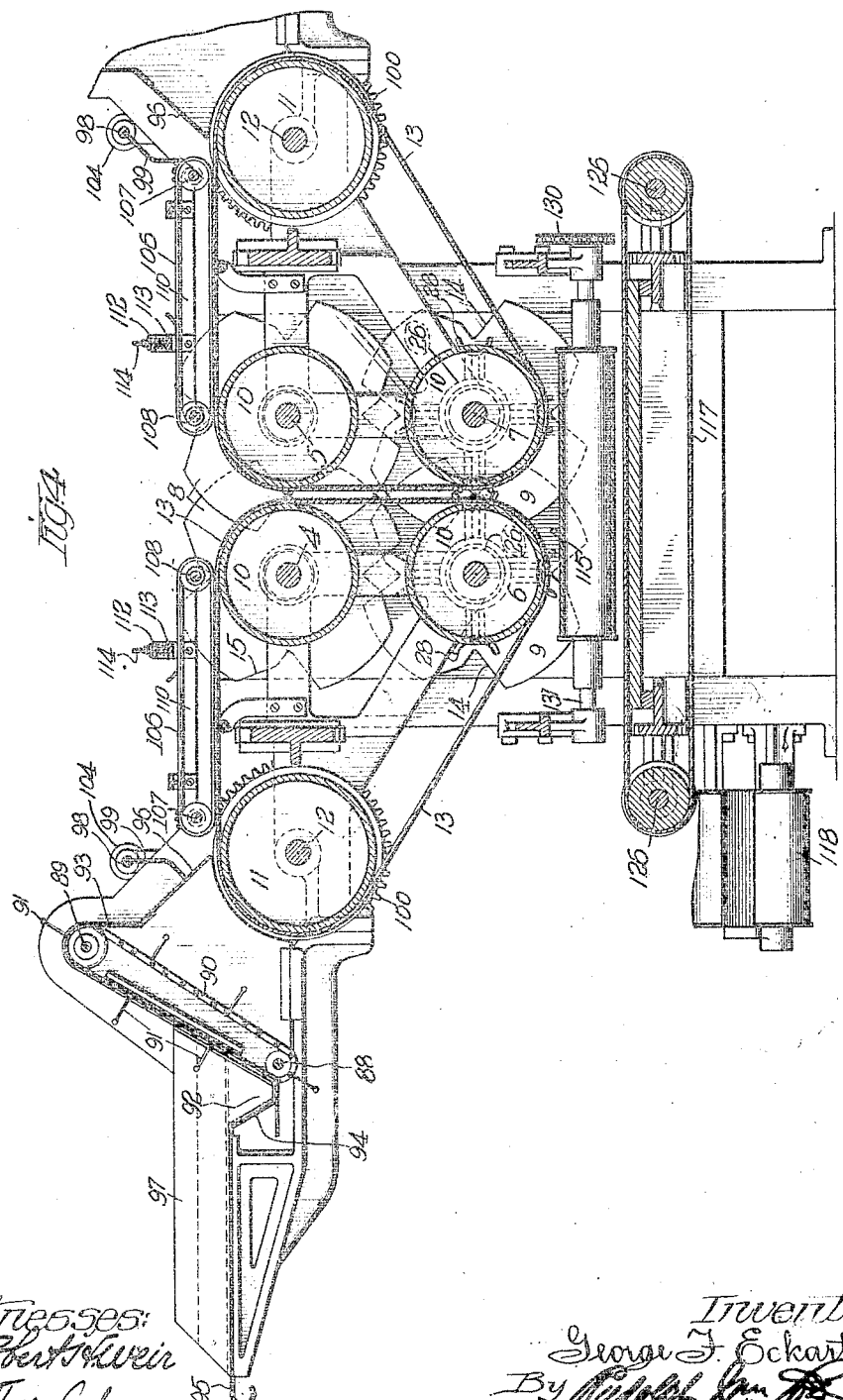

G. F. ECKART.
TOBACCO STEMMING MACHINE.
APPLICATION FILED JAN. 3, 1912.
1,044,506.
Patented Nov. 19, 1912.
11 SHEETS—SHEET 5.
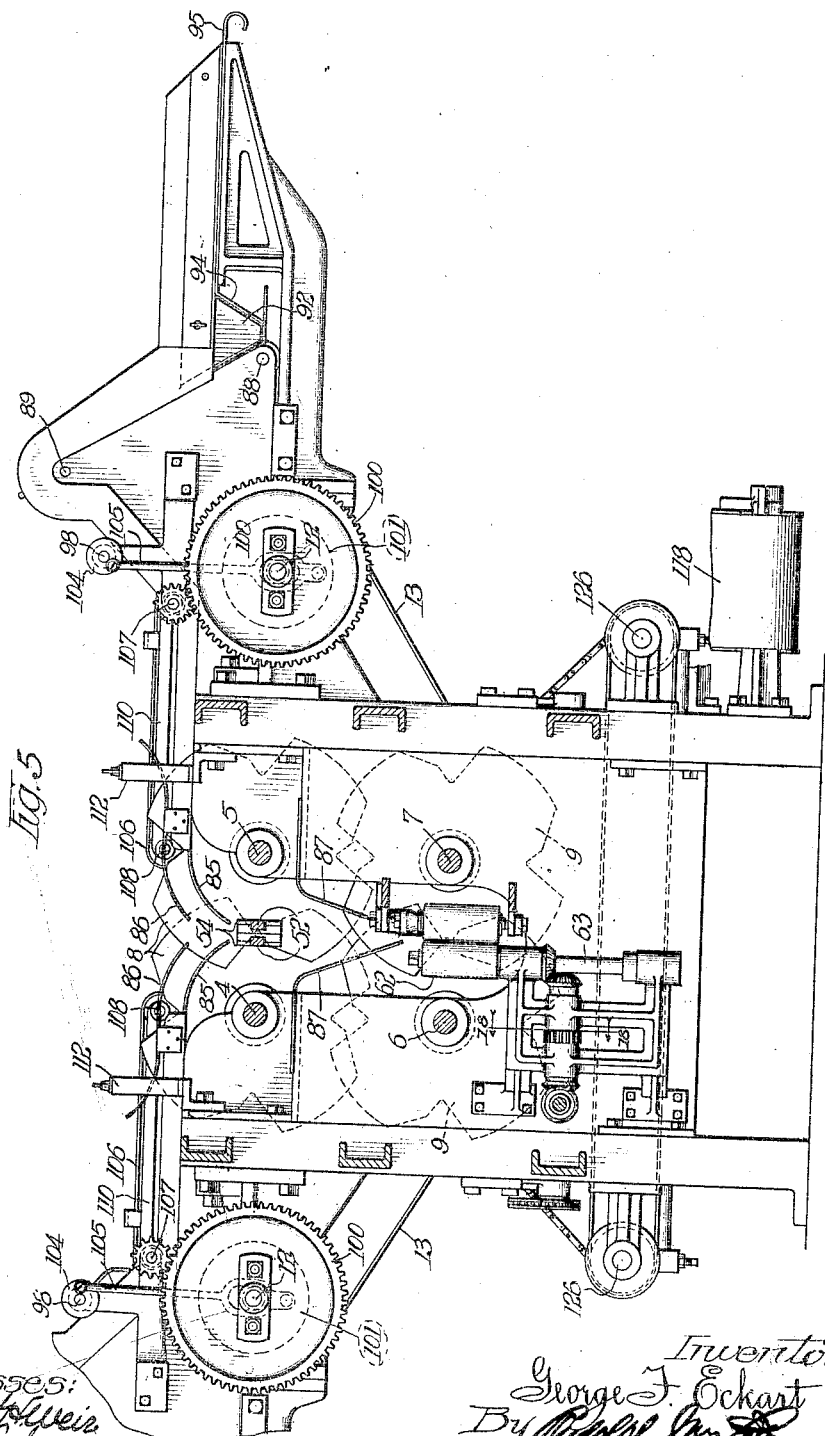

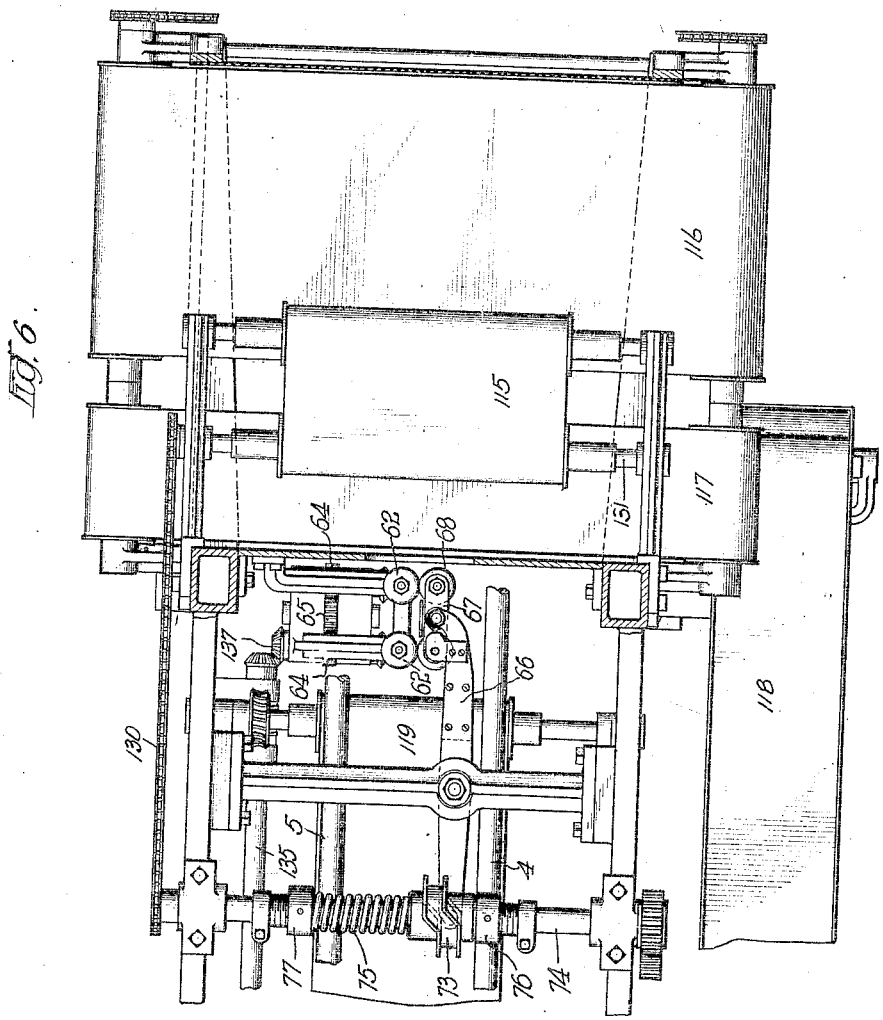

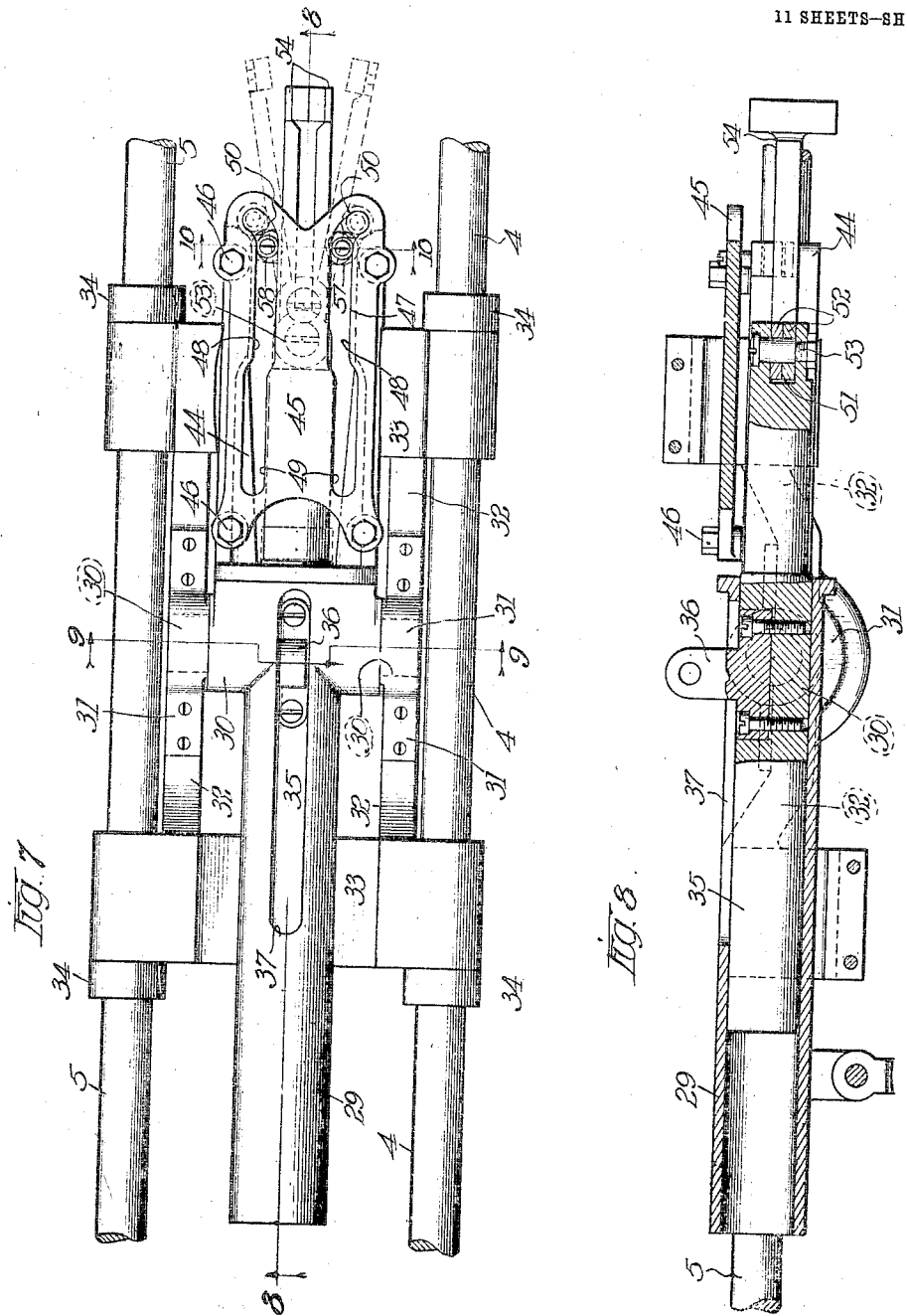

G. F. ECKART.
TOBACCO STEMMING MACHINE
APPLICATION FILED JAN. 3, 1912.
1,044,506.
Patented Nov. 19, 1912.
11 SHEETS—SHEET 8.
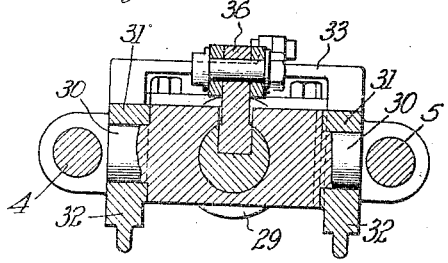
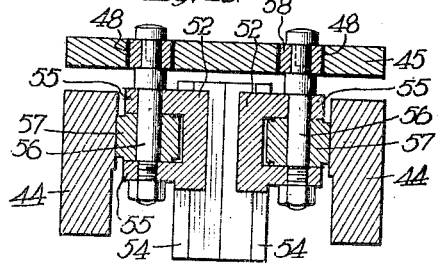
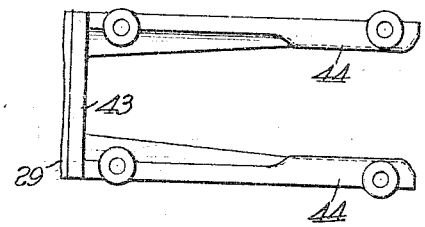
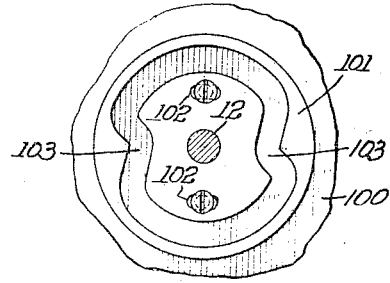
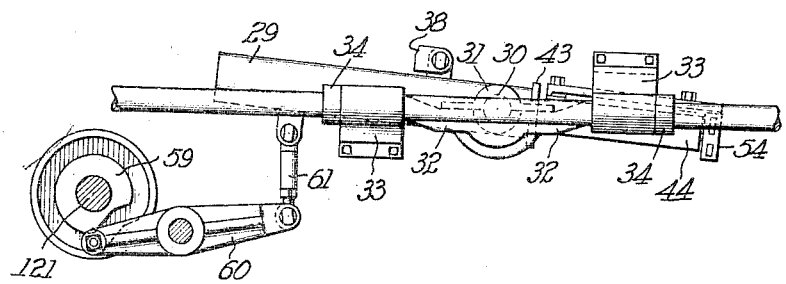

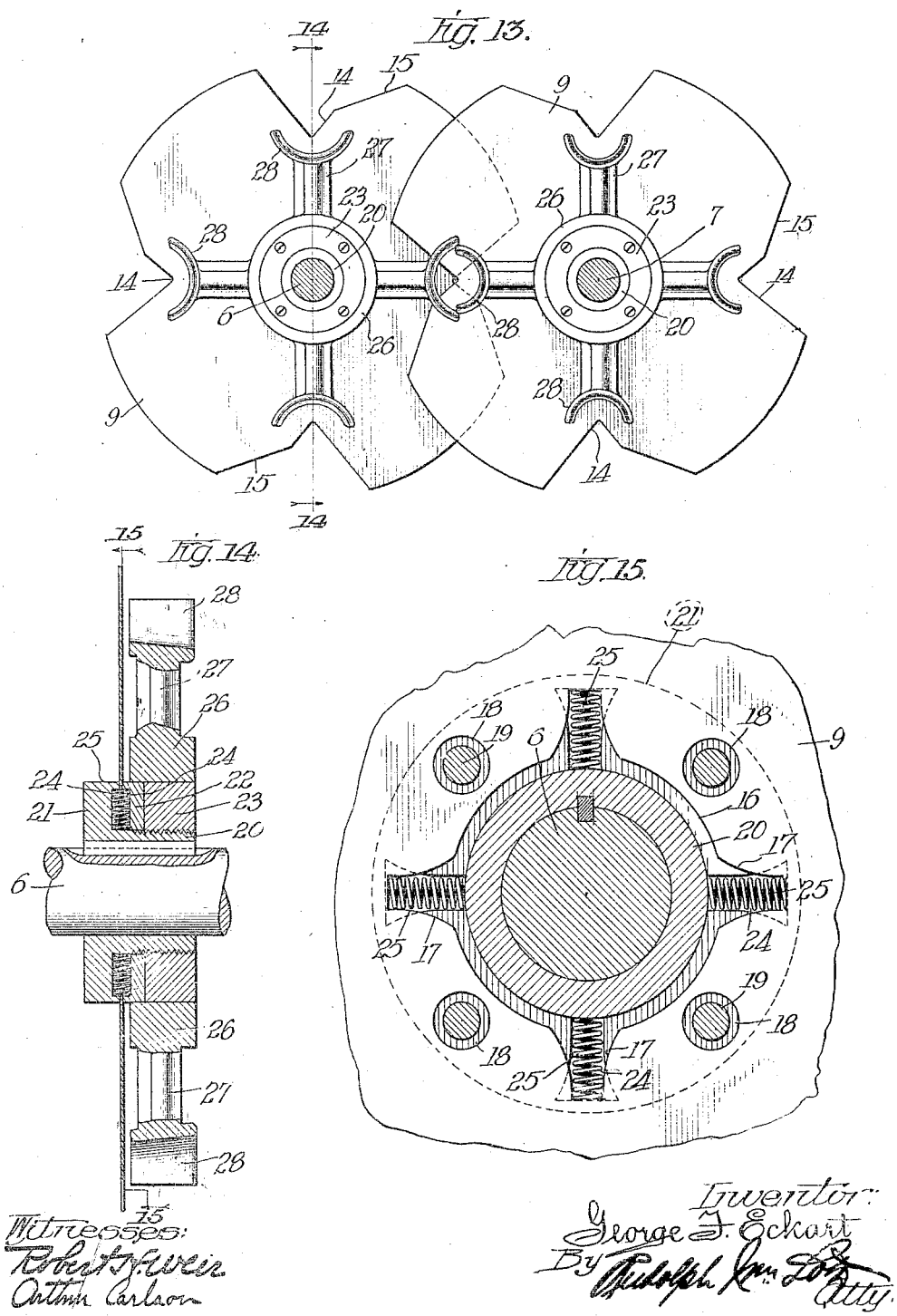

G. F. ECKART.
TOBACCO STEMMING MACHINE.
APPLICATION FILED JAN. 3, 1912.
1,044,506.
Patented Nov. 19, 1912.
11 SHEETS—SHEET 10.
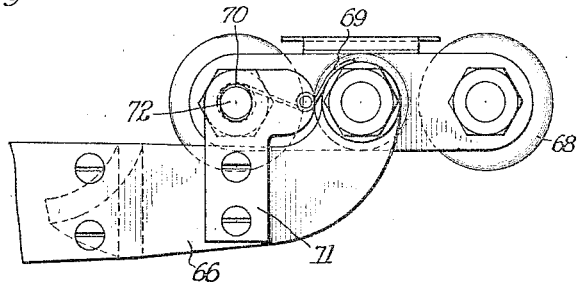
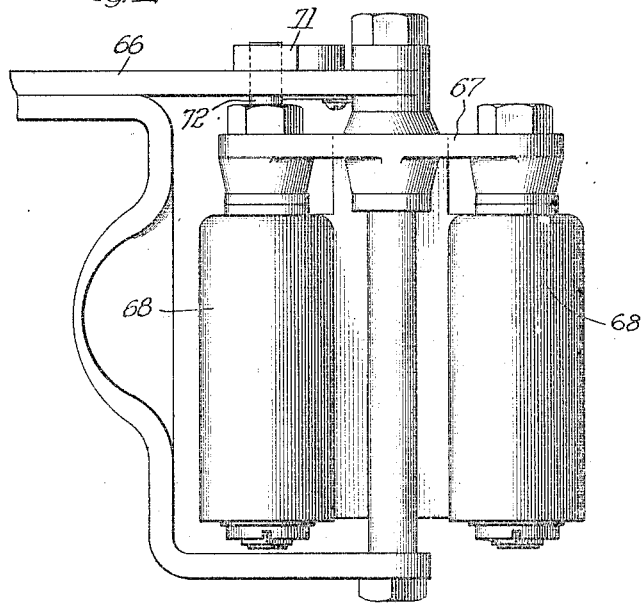
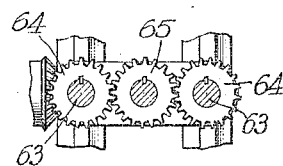

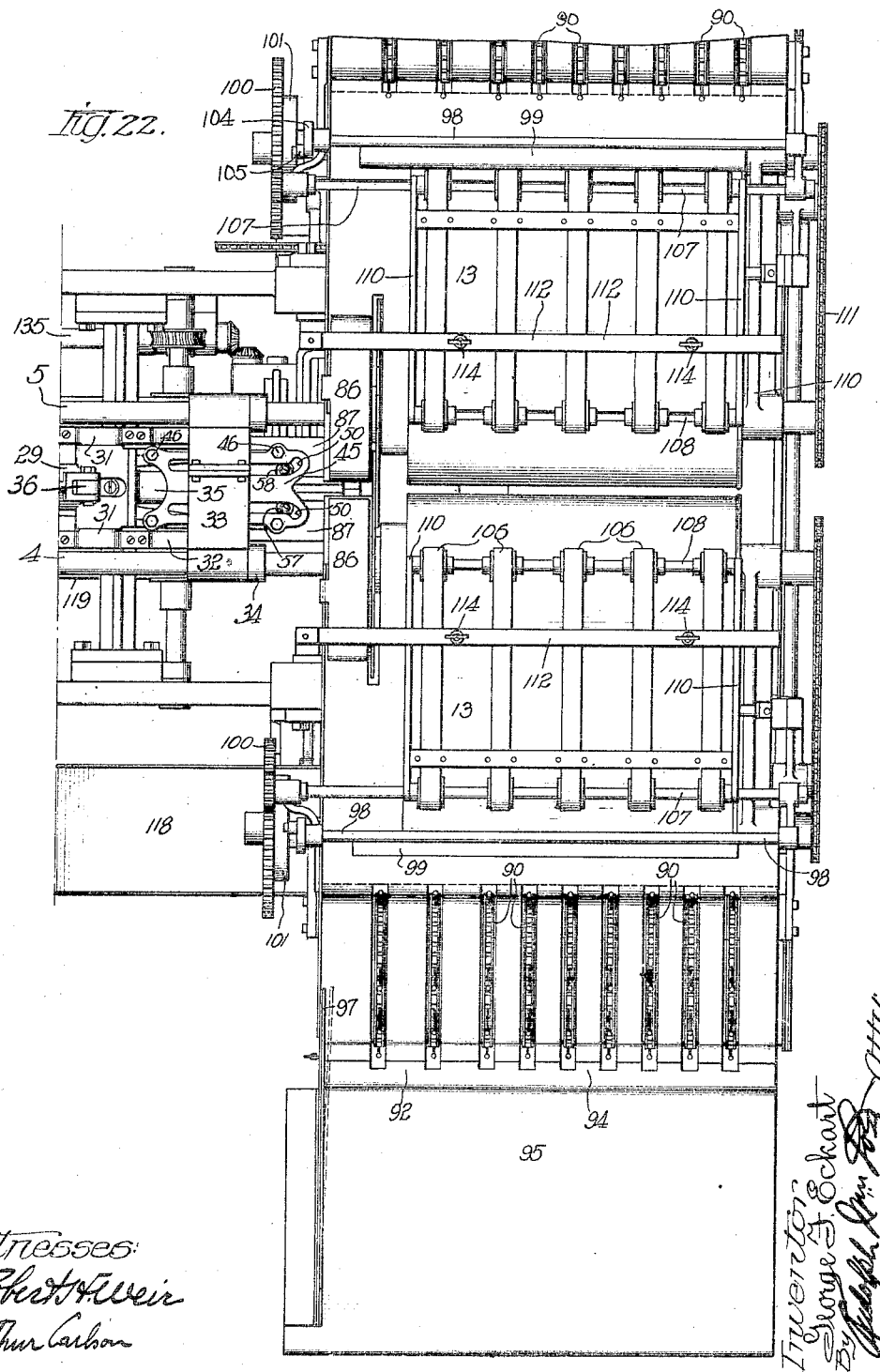

UNITED STATES PATENT OFFICE.

GEORGE F. ECKART, OF CHICAGO, ILLINOIS, ASSIGNOR TO AUTOMATIC STEMMER CO., OF CHICAGO, ILLINOIS, A CORPORATION OF DELAWARE.

TOBACCO-STEMMING MACHINE.

1,044,506.

Specification of Letters Patent. Patented Nov. 19, 1912.

Application filed January 3, 1912. Serial No. 669,243.

*To all whom it may concern:*

Be it known that I, GEORGE F. ECKART, citizen of the United States, residing at Chicago, in the county of Cook and State of Illinois, have invented certain new and useful Improvements in Tobacco-Stemming Machines; and I do hereby declare the following to be a full, clear, and exact description of the invention, such as will enable others skilled in the art to which it appertains to make and use the same.

This invention has for its object to provide an efficient machine for removing the stems and midribs from the laminæ of tobacco leaves with great rapidity and with the minimum amount of waste of the laminæ.

The accompanying drawings illustrate a complete machine constituting a suitable embodiment of the invention.

In these drawings: Figure —1— is a view in side elevation of the left-hand side of a tobacco stemming machine constructed in accordance with my invention. Figs. —2— and —3— together constitute a complete central vertical longitudinal section of the machine on an enlarged scale. Fig. —4— is a vertical transverse sectional view of the machine on an enlarged scale on the line 4—4 of Fig. —1— and shows the leaf feeding mechanism and part of the stripping or stemming mechanism of the same. Fig. —5— is a vertical transverse sectional view of the machine on the line 5—5 of Fig. —1— looking toward the front of the machine and showing the rear faces of the stripping or stemming disks. Fig. —6— is a fragmentary detail horizontal sectional view of the machine on the line 6—6 of Fig. —3— showing a part of the stripping or stemming mechanism. Fig. —7— is a detail top plan view of the reciprocating carriage carrying stem engaging means and cams for closing and opening the latter. Fig. —8— is a detail central vertical longitudinal section of the carriage, etc., shown in Fig. —7— and is taken on the line 8—8 of Fig. —7—. Fig. —9— and —10— are detail vertical transverse sections taken on the lines 9—9 and 10—10 respectively of Fig. —7—.
Fig. —11— is a detail plan view of a cam employed which is shown in Fig. —7—. Fig. —12— is a fragmentary detail view in side elevation showing the mechanism employed for rocking the stem gripping devices shown in Fig. —7—. Fig. —13— is a detail sectional view on the line 13—13 of Fig. —3— showing stripper disks employed. Fig. —14— is a detail central vertical section of one of the stripper disks on the line 14—14 of Fig. —13—. Fig. —15— is a vertical transverse section showing the hub of a stripper disk taken on the line 15—15 of Fig. —14—. Fig. 16 is a fragmentary detail plan view of what are termed the restemming rolls. Fig. —17— is a detail view in side elevation of the same. Fig. —18— is a fragmentary detail sectional view on the line 18—18 of Fig. —5—. Fig. —19— is a detail view of a cam controlling the time of delivery of successive leaves to the stemming mechanism. Fig. —20— is a fragmentary detail section showing the means employed for adjustably engaging the gears for actuating the shafts of the stripper disks rigid with said shafts. Fig. —21— is a detail vertical section on the line 21—21 of Fig. —20—. Fig. —22— is a plan view of the forward end portion of the machine showing the leaf feeding device employed, a part thereof being broken away at one side.

The machine illustrated in the accompanying drawings and which I will now describe, operates to shear the laminæ from the midribs of the leaves by drawing the stems and midribs through small openings formed between stripper disks, the walls of said openings having relatively sharp edges which serve to cut or shear the laminæ longitudinally from either side of the midribs as the latter pass through the openings. In the following description I will refer to the mid rib as the "stem" since it forms a continuation thereof.

The invention resides most particularly in the mechanism by means of which the stripping is effected, and the most essential feature of the invention resides in the provision of mechanism whereby the stripping of the laminæ from the stems is accomplished by several successive operations as distinguished from a single operation or relative movement of the stem and lamina, in the manner hereinafter particularly described. Associated with the stripping mechanism is a leaf feeding mechanism, lamina delivery mechanism, and stem cleaning and delivery mechanism, all of which are essential to a complete labor saving organization of elements adapted to deliver products ready for further treatment in the manufacture of various tobacco products, but all of which are auxiliary and subservient to the stripping mechanism.

The frame of the machine is of skeleton form adapted to the requirements of strength and to provide supports for the various operative parts. These comprise a drive shaft 1 and a number of countershafts geared thereto and from which the feeding, stripping, delivery and stem cleaning mechanisms are driven. The drive shaft is adapted to be suitably geared to a source of power, as by means of the tight and loose pulleys 2 and 3 over which a drive belt is trained in the usual manner. The said drive shaft 1 extends transversely of the frame and geared thereto by means of a suitable gear train are four shafts 4, 5, 6 and 7, the shafts 4 and 5 constituting one pair and the shafts 6 and 7 another pair which carry the cooperating pairs of stripper disks 8 and 9 respectively. These shafts also carry pulleys 10 which are loose thereon and over which belts 13 are trained, the latter being also trained over driven pulleys 11 mounted on a countershaft 12 parallel with the shafts 4 to 7 inclusive. The said belts constitute carriers for the leaves to be stripped to place the same successively in engaging relation to the said stripper disks.

Associated with the stripper disks is a reciprocating stem engaging mechanism which grips the stems of the leaves and draws the same forward through openings formed between said disks and thus causes the lamina to be sheared or stripped therefrom. The said stripper disks together with the said reciprocating stem gripping mechanism constitutes what may be termed the primary stemming mechanism. Associated with the stripper disks 9 is a rotary stem gripping mechanism which performs substantially the same function as the reciprocating mechanism above referred to with the single exception that while the first-named reciprocating mechanism imparts movement of predetermined length to the stems of the leaves the rotary stripping mechanism imparts an indeterminate and variable movement to the stems, the last-named movement being substantially continuous throughout the length of the stem and middle rib of the lamina to the point of severance of said midrib. As shown in Figs. —13— to —15— inclusive the said stripper disks are made of a suitable sheet metal. They are substantially circular and each thereof is provided with four equally spaced peripheral notches or recesses 14, the same being substantially V-shaped and one wall of each thereof being cut away angularly, as at 15, said cut-away portions being the first to meet to form the bottom of a recess open at its upper end to receive the stems of the leaves. In the center of each of said disks is a relatively large opening 16 and extending radially outwardly from said opening are four equally spaced recesses 17 which are flared so as to be of greater width at their inner than at their outer ends. Intermediate said recesses 17 are openings 18 through which pins or bolts 19 of less diameter than said openings are adapted to pass. The said disks, which I will in this detailed description refer to by the numeral 9, are mounted between two members relatively to which the same have a limited rotary and a limited radial movement in all directions. The said members comprise an externally threaded sleeve 20 having an annular flange 21 at one end. Loosely mounted on said sleeve opposing said flange 21 is a ring 22 which is held in place relatively to said flange 21 by means of the internally threaded stem 23. In the opposing faces of said flange 21 and ring 22 are recesses 24 which are radially disposed and flared so as to be of greater width at their outer than at their inner ends and in which helical compression springs 25 are received, the latter bearing upon the circumferential face of the sleeve 20 and upon the outer walls of the recesses 17 in said disk whereby the latter is maintained normally centered relatively to the axis of rotation of the ring. The said disk 8 is loosely guided between the said flange 21 and the ring 22 and may obviously, owing to the yielding nature of the springs 24, be moved radially in all directions and is permitted a limited rotary movement relatively to the ring. Mounted upon the said sleeve 23 and ring 22 is a hub 26 having four radial arms 27 each of which terminates in a substantially semi-cylindrical tapered guide 28. The said guides 28 carried by the hub 26 are disposed contiguous to the inner face of one of the disks 9 and are of larger diameter than those contiguous to the other of said disks 9 and are adapted to receive the latter, as shown in Fig —13—.

The disks 8 and 9 of each pair mounted on the shafts 4—5 and 6—7 rotate in relatively opposite directions so that the apexes or innermost corners of the notches therein become so disposed relatively to each other in the horizontal plane of the axes of the shafts carrying the respective pairs as to form small openings between the same through which the stems of the leaves to be stripped project, the said stems being received in said notches 14 prior to the overlapping of the opposed edges of two thereof and are released from said notches when the same again separate from each other. This portion of the construction of the machine and its operation will be most readily understood upon examination of Fig. —13— in which the arrows indicate the respective directions of rotation of the respective disks. It will be noted also that the guides 28 will loosely embrace the base of the lamina and the portion of the stem of the leaf contiguous thereto during travel, the purpose of said guides being to prevent an angular position of the lamina relatively to said disks whereby the stem will project at such an angle from the outer or rear faces of the disks as to be out of engaging relation to the gripping rolls which will be hereinafter fully described. The purpose of the springs 25 is to permit expansion of the opening formed by the opposed notches to receive the stems of several leaves at one time in the event that two or more thereof should be fed instead of a single leaf as is intended. They also permit lost and compensating movement of the disks to a limited extent to permit the same to adjust themselves automatically to slight variations in strains and stresses encountered in the operation of the machine during performance of the stripping operations.

The reciprocating gripping mechanism for imparting primary longitudinal movement to the stems while the latter are embraced in the notches of the disks 8, is shown in detail in Figs. —7— to —12— inclusive. It consists of a cylinder 29 equipped between its ends with trunnions 30 which are journaled in bearings 31 carried by the bars 32 which are supported in the cross-bars 33 supported upon the shafts 4 and 5, the latter being rotatable in the sleeves at the ends of said cross-bars 33, and the latter being held against movement longitudinally of said shafts by means of the collars 34. Longitudinally movable in the sleeve 29 is a plunger 35 which is equipped between its ends with a projection 36 extending through a longitudinal slot 37 in said sleeve and is connected by means of a pitman 38 with a rocking arm 39 disposed on the shaft 40 parallel with the drive-shaft. The said arm 39 is rocked by means of the crank 41 on the shaft 42 suitably geared to the drive shaft 1, and connected with said rocking arm by means of a pitman. Integral with the forward end of said sleeve 29 are two parallel cam arms 44 extending parallel with the axis of said cylinder and upon which the cam plate 45 is mounted by means of the bolts 46. The said cam plate is provided with two equal slots oppositely disposed upon respectively opposite sides of the middle thereof, the outer walls of said slots being of the same contour and disposed parallel with the inner opposed faces of the arms 44. Each of said slots 47 is provided with two straight portions 48 and 49 respectively, offset relatively to each other so that the similar portions 49 of the two slots are more widely separated from each other than the portions 48 thereof. The said portions 48 thereof terminate in outwardly curved portions 50 the extreme end portions of which are substantially as widely separated from each other as are the portions 49 of said slots.

The plunger 35 is provided in its forward end with a horizontal slot or recess 51 in which the ends of two opposed arms 52 are received, the same being pivotally secured therein by means of the bolt or pin 53. Each of said arms is provided at its other end with a flat flange or projection 54 of relatively great depth on the inner or opposed faces of which blocks of rubber or other suitable relatively soft frictional material are mounted, the latter being adapted to engage the stems of the leaves in an obvious manner, said arms constituting and being hereinafter referred to as "grippers." Each of said arms 52 is provided between its ends with a pair of projections 55 through which a pin 56 passes vertically and on which an antifriction roller 57 is rotatably mounted which travels on the inner opposed cam faces of said arms 44. Said pin also projects through one of the slots 48, 49, 50 of the plate 45 and carries an antifriction roller 58 which is rotatable thereon and travels on the walls of said slots. The said antifriction rollers 57 coact with the arms 44 to cause the gripper arms 52 to move toward each other in gripping the stems while the antifriction rollers contact with the innermost walls of the slots 48, 49, 50 to cause the said gripper arms to separate as they approach the respective limits of their reciprocal movement.

The gearing between the drive shaft 1 and the shafts 4 to 7 inclusive, is such as to maintain the latter constantly in rotation so that during the stripping operation the notches through which the stem of the leaf projects and is drawn (by means of said arms 52 and the parts actuating the same) move through a given arc, and, in order that the pull on the stem of the leaf shall be maintained constantly the same in direction from the beginning to the end of the stripping stroke of said grippers, the sleeve 29 must be oscillated on the horizontal axis of its trunnions 30, so as to cause the rubber faced ends of the grippers to move through the same length of arc as do the notches in the disks during the travel of the projections 54 rearwardly through the slots 48. The oscillation of the said sleeve 29 is effected by means of a cam 59, shown clearly in Fig. —7— and also in detail in Fig. —12—. said cam comprising a disk having a groove in one face which is mainly concentric with the axis of rotation thereof, the same being inwardly deflected through a short arc. A rocking lever 60 pivotally supported between its ends is equipped at one end with a roller engaging in the groove of said cam 59 and at its other end is connected by means of a link 61 with a projection on the rear end portion of said sleeve 29 so that during the time that the roller on said lever 60 engages in said inwardly deflected portion on the groove of said cam 59 the said sleeve 29 makes a relatively rapid oscillating movement from its normal position to swing the grippers upwardly in position to a cord with the elevation of the stem to be engaged and simultaneously with engagement of the stem by said grippers again downwardly to the normal position, the last-named downward movement being simultaneous with the movement of the notches in which the stem is engaged. It will be understood, of course, that the rearward movement of the plunger 35 and grippers 53 takes place simultaneously with the last-named movement of said grippers downwardly and that simultaneously with the completion of this movement the rollers 58 of said grippers pass into the slots 49 thus separating the grippers and releasing the stem which had been engaged between the same.

The belt 13 is geared to travel with the same speed as do the notches in which the stems of the leaves are engaged and during the stripping operation the leaf is free to move laterally over the surface of said belt 13. The leaves are fed to the machine in the condition that they leave the bunches or bales, the laminæ thereof being crushed together. When the stripping stroke of the grippers has been partially completed, the leaf is engaged between the opposed vertically traveling portions of the two belts 13 and is carried, while thus engaged and after having been partially stripped from the stem, from the first set of stripper disks 8, to the second set or pair 9 thereof. The latter are disposed rearwardly of the first pair and the notches thereof, therefore, engage the stems of the partially stripped leaves forward of the point at which the first stripper disks 8 last engaged the same. During the primary stripping operation the leaf or lamina obviously becomes bunched or corrugated against the front faces of the stripper disks 8 and is relatively tightly wedged against the same. This bunching or corrugation and compression of the lamina around and in the notches of the stripper disks naturally prevents the sharp edges of said notches from performing the shearing function through a long length of lamina and consequently the primary stroke is rendered relatively short so as to separate the toughest portion of the midrib of the leaf, and terminates at a point where the strain or tension on the stem necessary to continue the stripping operation becomes so great as to exceed the strength of such midrib and would, if continued, cause the latter to tear. During the passage of the leaf from the first pair to the second pair of said stripper disks 8 and 9 respectively, that portion of the lamina which had been previously bunched, corrugated and compressed against the front faces of the first pair of stripper disks is permitted to expand and unfold, and thus, when the midrib is engaged in the notches of the second pair of stripper disks 9, the previously bunched portions of the lamina will hang freely and permit that portion of the lamina which is still unsevered from the said midrib to come in contact with the front faces of the said second pair 9 of stripper disks and thus be subjected to the shearing action of the sharp edges of the notches therein. The stripping operation is then continued until a portion of the midrib too weak to bear the tension thereon requisite to continuance of such stripping operation, passes through the notches and tears or breaks. Thus each lamina is stripped from its stem or midrib from a point in the latter near the point of the lamina to the base thereof, said lamina as it leaves the machine being practically bifurcate and appearing substantially the same as leaves which have been stripped by hand except that the bifurcate edges are less ragged.

It will be understood from the foregoing that the first stripping operation is accomplished by drawing the stem of the leaf a given or predetermined distance. The stripping operation is, however, completed by drawing the stem an indeterminate distance and with relatively great rapidity so that the length of the midrib severed from the leaf is dependent entirely upon the strength of said midrib and not upon a given relative severing movement between the same and the leaf or lamina.

In Figs. —6—, —16—, —17— and —18— I have illustrated the devices for engaging the stem of the leaf to impart to it the final indeterminate movement relatively to the lamina to complete the stripping operation. These devices comprise a pair of driven rolls 62 rotatable on vertical shafts 63 geared to each other by means of the spur gears 64 and 65 and which are also geared to the shaft 1 by a suitable gear train. A rocking arm 66, pivotally mounted between its ends on a part of the frame, carries an oscillating frame 67 at one end in which are carried two idle rolls 68. The said frame 67 is maintained by means of a spring 69 in a given position relatively to the arm 66, the oscillating movement thereof relatively to said arm 66 being limited by means of a slot 70 in a plate 71 mounted upon the said arm and in which one end of the shaft 72 of one of said rollers 68 engages. At its other end said arm 66 carries an anti-friction roller which engages in the peripheral groove of the cam 73 mounted upon a horizontal shaft 74 journaled in the frame of the machine and suitably geared to the drive shaft 1. The said groove of said cam 74 has two relatively off-set portions by means of which the arm 63 is thrown into position to bring the rollers 68 in surface contact with the driven rolls 62 and maintain the same in such contact and to then throw said arm in position to maintain the roller 68 at a distance from said rollers 62 in which lastnamed position the stem to be engaged is adapted to pass into engaging relation to said several pairs of rolls 62 and 68. The said cam 73 is longitudinally movable on the shaft 74 but is nonrotatable relatively to the same and is normally held by means of a spring 75 in engagement with a collar 76 on said shaft, said cam being free to move against the action of said spring 75 to enable the rollers 68 to yield away from the rollers 62 to accommodate the relative positions of said rolls to the varying thickness of stem and mid-rib engaged between the same. Said collar 76 and a similar collar 77 against which said spring bears at one end may be adjusted on said shaft 74 to adjust the pressure exerted by said spring on said cam 73 and to adjust the position of the latter for obvious purposes. The rollers 62 rotate constantly at a relatively high surface speed and when the rollers 68 are thrown into contact therewith, either directly or through the mediacy of an interposed stem or stems, the said rollers 68 will obviously rotate at the same surface speed as said rollers 62 and the stem or stems engaged between the said respective pairs of rolls will thus be moved longitudinally at the surface speed of said rolls to sever same from the lamina.

As previously stated the shafts 4 to 7 inclusive, are geared to rotate in unison. It is necessary, however, that the disks 8 and 9 shall be capable of being adjusted relatively to said shafts so as to time the meeting of the notches therein relatively to each other. To accomplish this, each of said shafts carries a sleeve 78 which is frictionally held against rotation thereon by any suitable means, an example being shown in Figs. —20— and —21—. Said sleeve is provided at one end with an annular flange 79 in which are segmental slots 80 through which set screws pass into the flanges 82 of sleeves 83 loosely mounted on said shaft. The latter carries the spur gear 84 for driving it. The said sleeves 78 may be loosened and a primary adjustment between the gear 84 and the shaft driven thereby effected. Then said sleeve 78 is tightened and thereafter further final and fine adjustment is effected by means of said set screws 81, as will be readily understood. It is also desirable that means be provided for guiding the stems of the leaves so that the same may assume such position relative to the grippers 52 and the rolls 62 and 68 as to insure engagement of said stems thereby. To this end guide plates 85 and 86 are suitably mounted on the frame of the machine, as clearly shown in Fig. —5—, between which the stems of the leaves pass alternately from opposite sides in an obvious manner. Below said plates 85 are guide plates 87 which converge toward each other contiguous to the rolls 62 and 68 and which serve to guide the stems to pass between said rolls preparatory to engagement thereby.

Associated with the belts 13 is a mechanism whereby the leaves are successively deposited upon said belts at regular intervals so that said leaves become spaced apart upon said belts distances equal to the length of the arc separating each two contiguous notches 14 in the said disks 9, said leaf-depositing mechanism being so timed relatively to the meeting of the said notches as to cause the stems of the leaves carried by the belts 13 to be received directly in the deepest portions of the same and remain engaged therein until they have been engaged by the grippers 52 and the said notches again separate. This leaf-depositing mechanism is duplicated on opposite sides of the vertical plane in which the stripping is effected, that is, one of said mechanisms is provided for each of the feed belts 13 so that a description of one thereof will suffice.

Trained over a plurality of sprocket wheels carried by shafts 88 and 89 suitably journaled in bearings on the frame of the machine at the forward end thereof, is a plurality of sprocket chains 90 each of which is equipped with outwardly projecting pins 91 spaced equi-distantly from each other. The said pins travel upwardly and downwardly in inclined planes and during their upward travel pass through a pocket 92 formed between the guard plates 93, disposed between contiguous chains 90, and the apron 94 at the end of a plate or table 95 upon which the leaves are deposited after being separated from the bunches or bales. The operator feeds one or two leaves at a time into the pocket 92 from which they are carried upwardly on said pins 91, and, after passing over the upper sprocket wheels over which said belts are trained, said leaves are successively deposited upon an inclined plate 96, the lower end of which is disposed over the horizontally traveling portion of the belt 13. In depositing the leaf or leaves in the pocket 92 the operator always places the leaf so that the stem thereof is in contact with the gage plate 97 bordering the rear end of said pocket. This plate 97 is disposed in a vertical plane rearward of the vertical plane of the stripper disks 8, as more particularly shown in Fig. —22—, so at as said leaf is deposited upon the feed belt 13, the stem thereof will project beyond the rearward side edge of the belt and beyond the vertical plane of the stripper disks 9. The said plate 97 is laterally adjustable, as shown in dotted lines in Fig. —22—, to vary the extent of projection of the stems of the leaves beyond the rear faces of the stripper disks 9.

Mounted upon a rock-shaft 98 is an apron 99, the lower edge of which is adapted to contact with the plate 96 at intervals to form a pocket in which the leaves are successively received from the pins 91 and are retained during a given interval, said apron being moved out of the path of the leaf at properly timed intervals to permit the same to drop upon said feed-belt 13 and be carried forward thereby into engaging relation to the notches in the stripper disks.

On the shaft 12 is the gear 100 and contiguous to said gear 100 there is loosely mounted on said shaft a cam 101 having segmental slots 102 through which set-screws or bolts pass through the gear 100 to hold said cam rigid with said gear and permit adjustment of the same rotatably relatively thereto. Said cam is shown in detail in Fig. —19—. In one face of said cam 101 is a groove having inward deflections 103 at diametrically opposite points. On the shaft 98 is a crank 104 to which a plunger 105 is pivotally secured, the latter being equipped at its other end with an antifriction roller traveling in said groove of said cam 101. The deflected portions 103 of the latter are adapted to impart reciprocating movement to said plunger at regular intervals to rock said shaft 98 for the purpose of automatically retarding and releasing the leaves fed by the said sprocket chains 90.

Traveling over the horizontally moving portions of the belts 13, and at a surface speed equal thereto, are small belts 106 trained over pulleys carried by the shafts 107—108, the shaft 107 being geared by means of a spur pinion with the gear 100. The shaft 108 is journaled in bearings in two bars 110 pivotally engaged with said shaft 107. A cross-bar 112 supported on standards mounted upon the frame is disposed above a bar 113 secured at its ends to the bars 110 and which is vertically adjustable relatively to the bar 112 by means of the threaded projections carrying the wing nuts 114, said bar 113 being maintained normally at the lower limit of its movement by means of springs surrounding said threaded projections and being adapted to be raised against the action of said springs by turning said wing nuts in one direction. The pressure exerted by said belts 106 upon the belt 113 or the interposed leaves may thus be adjusted as desired. The said leaf-depositing mechanism on opposite sides of the vertical plane in which the stripping operations are effected are geared respectively, to feed leaves to the stripper disks 8 alternately, each of said mechanisms being adapted to feed two leaves for each complete revolution of the disks 8.

Disposed below the feed belts and in front of the vertical plane of the stripper disks are a plurality of carrier belts. The belt 115 travels longitudinally of the machine and is adapted to carry such leaves as may not have been stripped of their stems toward the front of the machine and deposit the same upon a belt 116 traveling transversely thereto which delivers the unstemmed leaves into any suitable receptacle disposed near the operators who are feeding leaves to the machine. The leaves whose stems are not engaged by the grippers 54 and which, therefore, are not stemmed, remain engaged between the vertically moving parts of the feed belts 13. The belt 115 is so disposed relatively to these belts that anything engaged between the latter and carried down thereby will drop upon said belt 115 and be carried thereby and dropped upon the belt 116. But those leaves which are stemmed, are drawn during the second stemming or stripping operation out of engagement with the belts 13 and thus drop by gravity into the space between the belts 13 and the disks 9. The belt 117 forms the bottom of this space and receives said leaves. As shown in Fig. —4— the belt 117 projects over the belt 118 which receives said leaves from the former and conveys them to the rear end of the machine where a suitable receptacle therefor may be placed.

The stems removed from the leaves are fed by the rollers 62—68 upon a belt 119 which delivers them to a stem-cleaning mechanism indicated at 120, said mechanism comprising a plurality of rotating brushes, etc., which are adapted to brush from the stems all particles of leaf which may not have been removed therefrom during the stripping operation and delivers the scraps thus removed into a suitable receptacle therefor. The said stem-cleaning mechanism forms no part of the present invention and particular description thereof, is therefore, omitted.

The various parts of the machine are geared to the drive shaft 1 as follows: Said drive shaft 1 carries a spur pinion meshing with a spur gear on the shaft 121. The latter carries a spur pinion meshing with a spur gear on a stud shaft 122 and said spur gear meshes with the spur pinion on the shaft 42. Said spur pinion on said shaft 42 meshes with the spur gear on the stud shaft 123 and the last-named spur gear meshes with a spur gear on the shaft 124. The latter is geared by means of bevel gears with the vertical shaft 125 which is in turn geared by means of bevel gears with the shafts 4 and 6 driving the stripper disks 8 and 9 and which are also geared by means of sprocket wheels and chains with the shafts 126 from which the belts 116 and 117 are driven in respectively opposite directions. The shafts 4 and 6 are geared by means of spur gears with the shafts 5 and 7 to drive the latter in the opposite direction at the same speed. The shafts 4 and 5 are in turn geared by means of sprockets and chains with the shafts 12 carrying the rollers 11 from which the belts 13 are driven and the shafts 12 are in turn geared by means of sprockets and chains with the shafts 88 to drive the sprocket chains 90. The spur pinion on the shaft 121 meshes with a spur gear on a shaft 127 on which the rocking lever 60 is pivotally mounted and the spur gear on said shaft 127 meshes with a spur gear on the stud shaft 128 which in turn meshes with a spur pinion on a shaft 74, the latter geared by means of sprocket wheels and chain 130 with the shaft 131 from which the carrier belt 115 is driven. The shaft 42 is geared by means of bevel gears with the shaft 132 which is in turn geared by means of bevel gears with the horizontal shaft 133, the latter being geared to the shaft 134 by means of spur gears. The shaft 134 is geared by means of bevel gears with the longitudinal shaft 135 which has the worm gear connection with the shaft 136 from which the carrier belt 119 is driven. This shaft 135 is also geared by means of bevel gears with the shaft 137 which in turn is geared by means of bevel gears with one of the shafts 63, the latter being, as previously described, geared by means of the idle gear 65 with the other shaft 63 carrying one of the rollers 62. The shaft 121 is also geared by means of sprocket wheels and chain with the shaft 138 carrying the spur gear from which the rolls and brushes of the stem-cleaning mechanism are driven. The latter is also partly driven from the shaft 139 which is geared by means of the sprocket chain 140 with the shaft 134. The shaft 121 is further geared by means of suitable sprocket wheels and chain with the shaft 141 from which the carrier belt 118 is driven.

The gearing may obviously be changed and varied as desired to promote strength, durability and efficiency and does not, in and of itself, constitute a part of this invention.

I claim as my invention:

1. In a machine of the kind specified, the combination with rotatable stripper disks equipped with coacting peripheral notches adapted to form openings through which the stems of leaves are adapted to project, said notches disposed at regular intervals in the peripheries of said disks, of means for feeding leaves into engaging relation to the said notches, comprising carrying means adapted to travel at the same speed as the inner ends of said notches and through an arc of substantially the same radius, and means actuated at intervals corresponding with the intervals at which said notches pass a certain point in their travel to deposit leaves upon said carrying means.

2. In a machine of the kind specified, the combination with rotatable stripper disks equipped with coacting peripheral notches adapted to form openings through which the stems of leaves are adapted to project, said notches disposed at regular intervals in the peripheries of said disks, of means for feeding leaves into engaging relation to the said notches, comprising carrying means, adapted to travel at the same speed as the inner ends of said notches, and through an arc of a radius corresponding with the radial distance of the inner ends of said notches from the axes of rotation of said disks and concentric with one of the latter, and means actuated at intervals corresponding with the intervals at which said notches pass a certain point in their travel to deposit leaves upon said carrying means.

3. In a machine of the kind specified, the combination with rotatable stripper disks equipped with coacting peripheral notches adapted to form openings through which the stems of leaves are adapted to project, said notches disposed at regular intervals in the peripheries of said disks, of means for feeding leaves into engaging relation to the said notches, comprising carrying means, adapted to travel at the same speed as the inner ends of said notches, and through an arc of radius corresponding with the radial distance of the inner ends of said notches from the axes of rotation of said disks and concentric with one of the latter, devices controlling the deposit of leaves on said carrying means, and gearing between the latter and the disk actuating means for actuating said devices at intervals corresponding to the meeting respectively of the several notches in said disks.

4. In a machine of the kind specified, the combination with rotatable stripper disks equipped with coacting peripheral notches adapted to form openings through which the stems of leaves are adapted to project, said notches disposed at regular intervals in the peripheries of said disks, of means for feeding leaves into engaging relation to the said notches, comprising carrying means, adapted to travel at the same speed as the inner ends of said notches, and through an arc of radius corresponding with the radial distance of the inner ends of said notches from the axes of rotation of said disks and concentric with one of the latter, devices controlling the deposit of leaves on said carrying means, and gearing between the latter and the disk actuating means for actuating said devices at intervals, whereby the leaves are deposited upon the carrying means substantially at the points thereon which subsequently register with said notches in said disks.

5. In a tobacco stemming machine, a pair of rotatable stripper disks having peripheral recesses adapted to meet to form openings and in which the stems of the leaves are adapted to be engaged, said recesses disposed at regular intervals in the peripheries of said disks, a pair of traveling carrier belts, a pulley rotatable on the axis of each of said disks and over each of which one of said belts is trained, the leaf supporting surfaces of said belts passing over said pulleys being in substantial alinement with the innermost portions of said recesses in said disks, and means geared to the belt actuating means for depositing leaves on each of said belts at points therein adapted to move into alinement with said recesses in the disk contiguous thereto.

6. In a tobacco stemming machine, a pair of rotatable stripper disks having peripheral recesses adapted to meet to form openings and in which the stems of the leaves are adapted to be engaged, said recesses disposed at regular intervals in the peripheries of said disks, a pair of traveling carrier belts, a pulley rotatable on the axis of each of said disks and over each of which one of said belts is trained, the leaf supporting surfaces of said belts passing over said pulleys being in substantial alinement with the innermost portions of said recesses in said disks, means for determining the position of the leaves on the belts relatively to the side edges thereof, and means geared to the belt actuating means for depositing leaves on each of said belts at points therein adapted to move into alinement with said recesses in the disk contiguous thereto.

7. In a tobacco stemming machine, a pair of rotatable stripper disks having peripheral recesses adapted to meet to form openings and in which the stems of the leaves are adapted to be engaged, said recesses disposed at regular intervals in the peripheries of said disks, a pair of traveling carrier belts, a pulley rotatable on the axis of each of said disks and over each of which one of said belts is trained, the leaf supporting surfaces of said belts passing over said pulleys being in substantial alinement with the innermost portions of said recesses in said disks, each disk having a plurality of pairs of said recesses, and means geared to the belt actuating devices for alternately depositing leaves on said respective belts at points therein adapted to move into alinement with alternate recesses in the respective disks contiguous thereto.

8. In a machine of the kind specified, the combination with a pair of constantly rotating stripper disks provided with peripheral recesses adapted when opposed to border openings through which the stems of leaves are adapted to project, and reciprocating stem gripping means adapted to impart longitudinal movement to the stems projecting through said openings, of means for imparting rocking movement to said gripping means while engaged with said stems whereby the grippers are caused to follow the travel of the notches during the stripping movement.

9. In a machine of the kind specified, the combination with a pair of constantly rotating stripper disks provided with peripheral recesses adapted when opposed to border openings through which the stems of leaves are adapted to project, and reciprocating stem gripping means adapted to impart longitudinal movement to the stems projecting through said openings, of a carriage for said gripping means, and devices for imparting rocking movement to said carriage during the reciprocatory stroke of said gripping means in one direction while engaged with the stem of a leaf whereby the grippers are caused to follow the travel of the notches during the stripping movement.

10. In a machine of the kind specified, the combination with a pair of constantly rotating stripper disks provided with peripheral recesses adapted when opposed to border openings through which the stems of leaves are adapted to project, and reciprocating stem gripping means adapted to impart longitudinal movement to the stems projecting through said openings, of means acting to impart movement of said gripping means in the direction of travel imparted to the stems by said stripper disks during the interval of engagement of said gripping means therewith.

11. In a machine of the kind specified, the combination with a pair of constantly rotating stripper disks provided with peripheral recesses adapted when opposed to border openings through which the stems of leaves are adapted to project, and reciprocating stem gripping means adapted to impart longitudinal movement to the stems projecting through said openings, of a reciprocable plunger, stem gripping jaws carried thereby, means for opening and closing said jaws during their reciprocating movements, and means acting to impart movement to said plunger laterally of its direction of reciprocating movement to cause said jaws to follow the travel of said notches in said disk during engagement of the stems by said jaws.

12. In a machine of the kind specified, the combination with a pair of constantly rotating stripper disks provided with peripheral recesses adapted when opposed to border openings through which the stems of leaves are adapted to project, and reciprocating stem gripping means adapted to impart longitudinal movement to the stems projecting through said openings, of a carriage, a plunger carried thereby, means for imparting reciprocatory movement to said plunger, stem gripping jaws carried by said plunger, means for opening and closing said jaws during the reciprocatory movement of said plunger, and means for imparting movement to said carriage in a direction laterally to the direction of reciprocatory movement of said plunger and during such movement thereof, whereby said jaws are caused to follow the direction of travel of the notches in the disk during engagement of stems therein and by said jaws.

13. In a machine of the kind specified, the combination with a pair of constantly rotating stripper disks provided with peripheral recesses adapted when opposed to border openings through which the stems of leaves are adapted to project, and reciprocating stem gripping means adapted to impart longitudinal movement to the stems projecting through said openings, of a carriage, means for oscillating the same, a plunger carried thereby, means for imparting reciprocatory movement thereto, a pair of stem gripping jaws on said plunger, and means on said carriage for opening and closing said jaws during the reciprocatory movement thereof.

14. In a machine of the kind specified, the combination with a pair of constantly rotating stripper disks provided with peripheral recesses adapted when opposed to border openings through which the stems of leaves are adapted to project, and reciprocating stem gripping means adapted to impart longitudinal movement to the stems projecting through said openings, of a carriage, means for oscillating the same, a plunger carried thereby, means for imparting reciprocatory movement thereto, a pair of stem gripping jaws on said plunger, and a cam on said carriage engaged with said jaws for opening and closing the same at intervals during the reciprocatory movement thereof.

15. In a machine of the kind specified, stripper disks each provided with a central opening, an actuating shaft of less diameter than said opening passing therethrough, collars rigid with said shaft between the opposing faces of which said disk is loosely engaged, pins mounted in the opposing faces of said collars and passing through openings of larger diameter in said disk, there being radial recesses in said disk, communicating with the central opening therein and having flaring inner ends and said collars provided in their opposing faces with radial recesses having flaring outer ends, and helical compression springs mounted in said recesses and bearing at their outer ends against the outer end walls of the recesses in said disk whereby the latter is permitted movement rotatably and radially relatively to its actuating shaft.

16. In a machine of the kind specified, the combination with a pair of constantly rotating stripper disks provided with peripheral recesses adapted when opposed to border openings through which the stems of leaves are adapted to project, and reciprocating stem gripping means adapted to impart longitudinal movement to the stems projecting through said openings, of a pair of driven rolls, a pair of idle rolls between which and said driven rolls the stems of leaves engaged in said stripper disks are adapted to be engaged to impart longitudinal movement thereto, a rocking lever carrying said idle rolls, a cam for actuating the same, and a spring engaging said cam and permitting the same to be moved against its action by separation of the driven and idle rolls by the passage therebetween of stems.

17. In a machine of the kind specified, the combination with a pair of constantly rotating stripper disks provided with peripheral recesses adapted when opposed to border openings through which the stems of leaves are adapted to project, and reciprocating stem gripping means adapted to impart longitudinal movement to the stems projecting through said openings, of a pair of driven rolls, a pair of idle rolls between which and said driven rolls the stems of leaves engaged in said stripper disks are adapted to be engaged to impart longitudinal movement thereto, a rocking lever carrying said idle rolls, means for imparting given rocking movement to said lever, and means whereby a yielding movement is allowed said lever for permitting separation of the driven and idle rolls by stems passing therebetween.

18. In a machine of the kind specified, the combination with a pair of constantly rotating stripper disks provided with peripheral recesses adapted when opposed to border openings through which the stems of leaves are adapted to project, and reciprocating stem gripping means adapted to impart longitudinal movement to the stems projecting through said openings, of a pair of driven rolls, a pair of idle rolls between which and said driven rolls the stems of leaves engaged in said stripper disks are adapted to be engaged to impart longitudinal movement thereto, a rocking lever carrying said idle rolls, means for imparting given rocking movement to said lever, and a spring operatively disposed relatively to said last-named means to permit movement thereof by said lever whereby said driven and idle rolls are permitted to be separated by the stems passing therebetween.

19. In a machine of the kind specified, the combination with a pair of constantly rotating stripper disks provided with peripheral recesses adapted when opposed to border openings through which the stems of leaves are adapted to project, and reciprocating stem gripping means adapted to impart longitudinal movement to the stems projecting through said openings, of a pair of driven rolls, a pair of idle rolls between which and said driven rolls the stems of leaves engaged in said stripper disks are adapted to be engaged to impart longitudinal movement thereto, a carriage for said idle rolls, a member carrying the same, and means for imparting movement to said member for throwing said idle rolls into and out of contact with said driven rolls.

20. In a machine of the kind specified, the combination with a pair of constantly rotating stripper disks provided with peripheral recesses adapted when opposed to border openings through which the stems of leaves are adapted to project, and reciprocating stem gripping means adapted to impart longitudinal movement to the stems projecting through said openings, of a pair of driven rolls, a pair of idle rolls between which and said driven rolls the stems of leaves engaged in said stripper disks are adapted to be engaged to impart longitudinal movement thereto, a carriage for said idle rolls, a member carrying the same, means for imparting movement to said member for throwing said idle rolls into and out of contact with said driven rolls, and a spring engaging said last-named means for permitting the same to be moved by said member, whereby said driven and idle rolls are permitted to be separated by the passage of stems therebetween.

21. In a machine of the kind specified, the combination with a pair of constantly rotating stripper disks provided with peripheral recesses adapted when opposed to border openings through which the stems of leaves are adapted to project, and reciprocating stem gripping means adapted to impart longitudinal movement to the stems projecting through said openings, of a pair of driven rolls, a pair of idle rolls between which and said driven rolls the stems of leaves engaged in said stripper disks are adapted to be engaged to impart longitudinal movement thereto, means for imparting relative movement to said driven and idle rolls for throwing them into and out of surface contact with each other, and means whereby said driven and idle rolls are permitted to yield away from each other to accommodate themselves to the varying thickness of stems engaged therebetween.

In testimony whereof I have signed my name in presence of two subscribing witnesses.

GEORGE F. ECKART.

Witnesses:
M. M. BOYLE,
RUDOLPH WM. LOTZ.